United States Patent [19]

Klimczak et al.

[11] Patent Number: 4,666,472
[45] Date of Patent: May 19, 1987

[54] DUST COLLECTOR WITH DEFLECTOR MEANS

[75] Inventors: William J. Klimczak, Racine; Rano R. Wells, Kenosha, both of Wis.

[73] Assignee: Wehr Corporation, Milwaukee, Wis.

[21] Appl. No.: 787,056

[22] Filed: Oct. 15, 1985

[51] Int. Cl.⁴ .............................................. B01D 46/04
[52] U.S. Cl. ......................................... 55/96; 55/302; 55/303
[58] Field of Search .................... 55/96, 302, 292, 303

[56] References Cited

U.S. PATENT DOCUMENTS

| | | | |
|---|---|---|---|
| 3,874,857 | 4/1975 | Hunn et al. | 55/302 |
| 4,367,080 | 1/1983 | Kordas | 55/302 |

FOREIGN PATENT DOCUMENTS

| | | | |
|---|---|---|---|
| 2131022 | 1/1973 | Fed. Rep. of Germany | 55/302 |
| 3004453 | 8/1981 | Fed. Rep. of Germany | 55/302 |
| 0982749 | 12/1982 | U.S.S.R. | 55/302 |

*Primary Examiner*—Charles Hart

[57] ABSTRACT

A dust collector comprising a hopper, an exhaust chamber, a wall separating the hopper and the exhaust chamber and including an opening, a hollow filter assembly for filtering contaminated air flowing through the opening from the hopper, the filter assembly comprising filter medium and having upper and lower ends, the upper end of the filter assembly registering with the wall opening such that the hopper is generally sealed from the exhaust chamber except through the wall opening and the filter medium of the filter assembly, an inlet into the hopper for introducing contaminated air into the hopper so that the contaminated air is caused to flow to the exhaust chamber through the filter medium whereby airborne contaminants are accumulated on the filter medium, a nozzle for selectively directing reverse pulses of air into the wall opening from the exhaust chamber whereby the reverse air pulses enter the filter assembly and generate airflow through the filter medium in the reverse of the direction of contaminated airflow to remove accumulated contaminants from the filter medium, and a deflector cylinder housed inside the lower end of the filter assembly for preventing the air pulses from impinging upon the filter medium.

17 Claims, 3 Drawing Figures

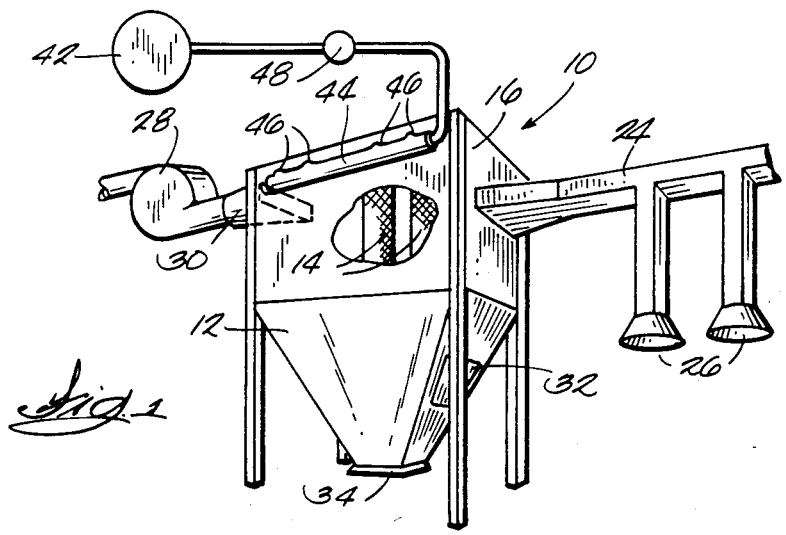
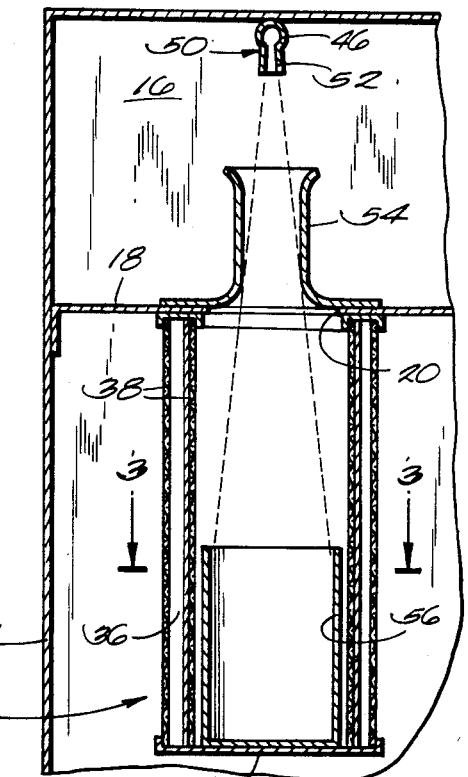
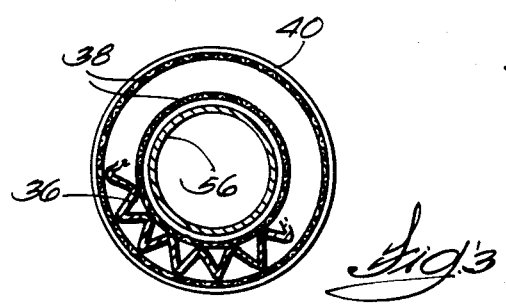

DUST COLLECTOR WITH DEFLECTOR MEANS

BACKGROUND OF THE INVENTION

The invention relates to air pollution control apparatus such as dust collectors, and more particularly to such apparatus as utilize a reverse stream of compressed air to periodically clean the filter medium in dust collectors.

It is known to utilize a reverse pulse of compressed air to clean contaminants which have accumulated on the filter medium of a dust collector. The filter medium acts essentially as a seive, retaining the dust on one side and preventing it from passing through to the other side. As a layer of dust builds on the surface of the filter medium, increased amounts of energy are required to force air through the filter medium. Accordingly, it is desirable to periodically remove the build-up or cake of contaminants which collects on the filter medium.

Various arrangements have been proposed for directing a reverse pulse of air into a dust collector filter assembly to clean the filter medium. A potential problem with the use of such air pulses is that they may remove the contaminants or cake from only a portion of the filter medium, leaving the remainder of the filter medium uncleaned. This can happen when the air pulses impinge directly upon a portion of the filter medium and blow the contaminants off that portion of the filter medium. This prevents the pressure in the filter assembly from building to a sufficient level so as to blow the contaminants off the remainder of the filter medium.

It is known to use a sleeve located in the inlet end of a filter assembly for preventing air pulses from impinging upon the filter medium of the filter assembly. This is described in Klimczak U.S. Pat. No. 4,578,092, issued Mar. 25, 1986 (application Ser. No. 548,911, filed Nov. 4, 1983).

SUMMARY OF THE INVENTION

The invention provides an improved arrangement for discharging a dust cake from the external surface of a dust collector filter medium. More particularly, the invention provides a means for cleaning the entire length of the elongated filter medium of a dust collector while employing a minimum amount of energy. With improved cleaning of the filter medium, the dust collector is more efficient in filtering air and can accordingly use fewer filters and have a smaller size than prior art dust collectors having the same air filtering capacity. Additionally, the cleaning means of the invention is energy efficient in that it employs a minimum amount of compressed air to clean the filter medium, thereby permitting the use of a smaller air pump or air compressor and the use of less energy in the operation of the air compressor.

Specifically, the invention provides a dust collector comprising a hopper, an exhaust chamber, and a wall separating the hopper and the exhaust chamber, the wall including an opening. The dust collector also comprises means for filtering contaminated air flowing through the opening from the hopper, the filtering means including a hollow filter assembly comprising a filter medium and having upper and lower ends, the upper end of the filter assembly registering with the wall opening such that the hopper is generally sealed from the exhaust chamber except through the wall opening and the filter medium of the filter assembly. The dust collector also comprises means defining an inlet into the hopper for introducing contaminated air into the hopper so that the contaminated air is caused to flow through the exhaust chamber through the filter medium whereby airborne contaminants are accumulated on the filter medium. The dust collector further comprises means for selectively directing reverse pulses of air into the wall opening from the exhaust chamber whereby the reverse pulses enter the filter assembly and generate air flow through the filter medium in the reverse of the direction of the contaminated air flow to remove accumulated contaminants from the filter medium, and means for preventing the air pulses from impinging upon the filter medium, this means including deflector means housed inside the lower end of the filter assembly.

In the preferred embodiment, the deflector means includes an air impermeable cylinder having an open upper end and an outer surface, the cylinder being supported by the lower end of the filter assembly and being positioned inside the filter assembly with the outer surface spaced from the filter medium, and with the upper end of the cylinder opening upwardly into the filter assembly. The cylinder has a length such that the air pulses entering the wall opening enter the upper end of the cylinder and do not impinge upon the filter medium. Preferably, the cylinder is a cylindrical cup having a closed lower end resting on the lower end of the filter assembly. In the preferred embodiment, the air pulse directing means includes a supersonic nozzle spaced above the wall opening for emitting the air pulses toward the wall opening in a cone-shaped pattern. The air pulse directing means preferably also includes a conduit in the exhaust chamber, and means for supplying air under pressure to the conduit. The nozzle is supported by the conduit.

The invention also provides a method for improving the operation of a dust collector, the method comprising the step of inserting an air impermeable deflector cylinder such as described above into the filter assembly of the dust collector. Preferably, the method further comprises the step of providing a supersonic nozzle.

The invention also provides an apparatus for improving the operation of a dust collector, the apparatus comprising an air impermeable cyclinder such as described above.

A principal feature of the invention is the provision of deflector means housed inside the lower end of the filter assembly for preventing the air pulses from impinging upon the filter medium. The deflector means is a simple yet effective means for improving the operation of the dust collector.

Other advantages of the invention will become apparent to those skilled in the art upon review of the following detailed description, claims, and drawings.

DESCRIPTION OF THE DRAWINGS

FIG. 1 is a perspective view of a dust collector embodying the invention.

FIG. 2 is an enlarged, vertical cross-sectional view of a portion of the dust collector.

FIG. 3 is a cross-sectional view taken along line 3—3 in FIG. 2.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

A dust collector 10 embodying the invention is illustrated in the drawings. The dust collector 10 includes a dust collecting hopper 12, and a series of elongated, cylindrical filter assemblies 14 suspended in the hopper 12 in a manner to be described hereinafter. The dust collector 10 also includes an exhaust or clean air chamber 16 above the hopper 12. The hopper 12 and the exhaust chamber 16 are separated by a horizontal wall or header plate 18 having therein a plurality of openings 20 arranged in rows. In the preferred embodiment, the openings 20 are generally circular, and a filter assembly 14 registers with each opening 20. This arrangement is conventional and has not been illustrated in its entirety.

Contaminated air is introduced into the hopper 12 by means of a side inlet and duct work 24. The contaminated air can come from any source, such as, for example, fume collector hoods 26 at a welding station or the like. A conventional fan 28 is connected by duct work 30 to the exhaust chamber 16. The fan 28 draws air from the exhaust chamber 16, thereby creating a pressure drop between the exhaust chamber 16 and the hopper 12 and causing a flow of contaminated air into the hopper 12 and through the filter assemblies 14 and the openings 20 into the exhaust chamber 16.

An access door 32 is provided in the hopper 12 for maintenance, such as replacement of the filter assemblies 14, and a discharge door 34 is provided at the bottom of the hopper 12 to permit the hopper 12 to be periodically emptied of dust and other contaminants.

As best shown in FIG. 2, each filter assembly 14 (only one will be described in detail) includes a filter medium 36 made of a conventional material which is pervious to air but not to airborne contaminants. In the illustrated construction, the filter assembly 14 is of the cartridge type, and the filter medium 36 is arranged in an accordian-like cylindrical pattern. The filter medium 36 is supported inside and outside by cylindrical metal screens or meshes 38 which provide mechanical support for the medium 36 but have a generally open contruction so as not to interfere with air flow. The lower end of the filter assembly 14 is closed by an end plate 40, and the upper end of the filter assembly 14 is connected to the header plate 18 in registry with an opening 20. Any suitable means for connecting the filter assembly 14 to the header plate 18 can be employed. Thus, the hopper 12 is generally sealed from the exhaust chamber 16 except through the wall opening 20 and the filter medium 36 of the filter assembly 14.

The dust collector 10 also comprises means for periodically cleaning accumulated cake from the external surface of the filter media 36. Preferably, such means includes means for selectively directing reverse pulses of air into the wall openings 20 from the exhaust chamber 16 whereby the air pulses enter the filter assemblies 14. The air pulses are reverse in the sense that they are in the direction opposite to the flow of air through the filter assemblies 14 during normal filtering operation. The air pulses are of short duration and interrupt the filtering operation of the dust collector 10 for only a short period of time. The air pulses dislodge the cake material from the filter media 36 of the the filter assemblies 14 such that it falls into the bottom of the hopper 12 where it can be removed.

The means for directing reverse pulses of air into the filter assemblies 14 also includes an air pressure source such as an air compressor 42 supplying air under pressure to a manifold 44, the manifold 44 being connected to pulse generating means spaced above the wall openings 20. The pulse generating means preferably includes air conduits or purge pipes 46 housed in the exhaust chamber 16 and supported by its upper wall. Valve means 48 are provided for selectively providing pulses of compressed air from the air compressor 42 to the manifold 44 and to the conduits 46. Each of the conduits 46 includes a plurality of downwardly opening orifices 50 positioned such that an orifice 50 is over each of the filter assemblies 14. In the preferred embodiment, the air pulse directing means also includes supersonic nozzles 52 supported by the conduits 46 and registering with the orifices 50. The nozzles 52 are spaced above the wall openings 20 and accelerate the air emitted toward the wall openings 20 to supersonic velocity. As best shown in FIG. 2, the air pulses propagate toward the wall openings 20 in a cone-shaped pattern.

In the preferred embodiment, the dust collector 10 also includes venturi tubes 54 mounted on the upper side of the header plate 18 in registry with the wall openings 20. Such venturi tubes are known in the art. It should be understood that in alternative embodiments the dust collector 10 need not include the venturi tubes 54.

In prior art arrangements, the reverse air pulses often impinge upon the inner surfaces of the filter media. As explained previously, this can result in the cleaning of only a portion of each filter medium, thereby reducing the efficiency of the dust collector.

Accordingly, the dust collector 10 further comprises means for preventing the air pulses from impinging upon the filter media 36 of the filter assemblies 14, this means including deflector means housed inside the lower ends of the filter assemblies 14. Since the deflector means are substantially identical, only one will be described in detail.

While various suitable deflector means can be employed, in the preferred embodiment, the deflector means includes an air impermeable cylinder 56 having an open upper end and an outer surface, the cylinder being supported by the lower end of the filter assembly 14 and being positioned inside the filter assembly 14 with the outer surface spaced from the filter medium 36, and with the upper end of the cylinder 56 opening upwardly into the filter assembly 14. The cylinder 56 has a length such that the air pulses entering the wall opening 20 enter the upper end of the cylinder 56 and do not impinge upon the filter medium 36. This length will vary with the dimensions and characteristics of the dust collector 10 (e.g., the inner length and diameter of the filter assembly 14, the diameter of the opening 20, the flow characteristics of the nozzle 52, the spacing of the nozzle 52 from the opening 20, etc.) but will not be longer than the inner length of the filter assembly 14.

In the preferred embodiment, the cylinder 56 has a closed lower end so that the cylinder 56 actually forms a cup, with the lower end of the cylinder 56 being supported by the end plate 40. It should be understood that in embodiments wherein the filter assembly 14 has a lower end that does not comprise filter medium, the lower end of the cylinder 56 can be open, since air pulses reaching the lower end of the cylinder 56 will not impinge upon filter medium. For example, in the illustrated construction, the cylinder 56 could have an open lower end, so that the air pulses would impinge upon the end plate 40. In embodiments wherein the lower end of the filter assembly 14 comprises filter medium, the lower end of the cylinder 56 must be closed in order to prevent impingement of the air pulses upon the filter medium.

The outer surface of the cylinder 56 must be spaced from the filter medium 36 in order to allow air to flow between the cylinder 56 and the portion of the filter medium 36 adjacent the cylinder 56 to clean contaminants from that portion of the filter medium 36.

The cleaning of a filter assembly 14 takes place as follows: An air pulse exits the nozzle 52 and propagates toward the wall opening 20 or venturi tube 54 in a cone-shaped pattern. The air pulse then exits the lower end of the venturi tube 54 and passes through the wall opening 20 into the filter assembly 14. The air pulse continues into the filter assembly 14 in a cone-shaped pattern and enters the upper end of the cylinder 56, where it impinges upon the inner surface of the cylinder 56, but not upon the filter medium 36. When the air pressure in the filter assembly 14 reaches a sufficient level, the air in the filter assembly 14 blows the accumulated cake off the entire outer surface of the filter medium 36.

Various features and advantages of the invention are set forth in the following claims.

We claim:

1. A dust collector comprising
a hopper,
an exhaust chamber,
a wall separating said hopper and said exhaust chamber, said wall including an opening,
means for filtering contaminated air flowing through said opening from said hopper, said filtering means including a hollow filter assembly comprising filter medium and having upper and lower ends, said upper end of said filter assembly registering with said wall opening such that said hopper is generally sealed from said exhaust chamber except through said wall opening and said filter medium of said filter assembly,
means defining an inlet into said hopper for introducing contaminated air into said hopper so that the contaminated air is caused to flow to said exhaust chamber through said filter medium whereby airborne contaminants are accumulated on said filter medium,
means for selectively directing reverse pulses of air into said wall opening from said exhaust chamber whereby the reverse air pulses enter said filter assembly and generate airflow through said filter medium in the reverse of the direction of contaminated airflow to remove accumulated contaminants from said filter medium, and
means for preventing the air pulses from impinging upon said filter medium, said means including deflector means housed inside said lower end of said filter assembly and generate deflector means including an air impermeable cylinder having an open upper end and an outer surface, said cylinder being supported by said lower end of said filter assembly and being positioned inside said filter assembly with said outer surface spaced from said filter medium, and with said upper end of said cylinder opening upwardly into said filter assembly, and said cylinder having a length such that the air pulses entering said wall opening enter said upper end of said cylinder and do not impinge upon said filter medium.

2. A dust collector as set forth in claim 1 wherein said air pulse directing means includes means for causing the air pulses to propagate toward said wall opening in a cone-shaped pattern, said means including pulse generating means spaced above said wall opening.

3. A dust collector as set forth in claim 2 wherein said pulse generating means includes a nozzle.

4. A dust collector as set forth in claim 2 wherein said pulse generating means includes means for accelerating the air emitted toward said wall opening to supersonic velocity, said means including a nozzle.

5. A dust collector as set forth in claim 4 wherein said means for directing reverse pulses of air further includes a conduit in said exhaust chamber and means for supplying air under pressure to said conduit, and wherein said nozzle is supported by said conduit and directs air from said conduit toward said opening.

6. A method for improving the operation of a dust collector wherein said dust collector includes a hopper, an exhaust chamber, a wall separating said hopper and said exhaust chamber, said wall including an opening, means for filtering contaminated air flowing through said opening from said hopper, said filtering means including a hollow filter assembly comprising filter medium and having upper and lower ends, said upper end of said filter assembly registering with said wall opening such that said hopper is generally sealed from said exhaust chamber except through said wall opening and said filter medium of said filter assembly, means defining an inlet into said hopper for introducing contaminated air into said hopper so that the contaminated air is caused to flow to said exhaust chamber through said filter medium whereby airborne contaminants are accumulated on said filter medium, means for selectively directing reverse pulses of air into said wall opening from said exhaust chamber whereby said reverse air pulses enter said filter assembly and generate an airflow through said filter medium in the reverse of the direction of contaminated airflow to remove accumulated contaminants from said filter medium, said method for improving the operation of the dust collector comprising the step of:
inserting an air impermeable deflector cylinder having a length, an open upper end, and an outer surface into said filter assembly such that said cylinder is supported by said lower end of said filter assembly and is positioned inside said hollow filter assembly with said outer surface spaced from said filter medium, and with said upper end of said cylinder opening upwardly into said filter assembly, said cylinder length being such that the air pulses entering said wall opening enter said upper end of said cylinder and do not impinge upon said filter medium.

7. A method as set forth in claim 6 wherein said air pulse directing means includes a conduit in said exhaust chamber, means for supplying air under pressure to said conduit, and means for directing air from said conduit toward said wall opening such that said air pulses are emitted from said conduit and propagate toward said wall opening in a cone-shaped pattern, and wherein said method further comprises the step of providing a nozzle directing reverse pulses of air from said conduit toward said wall opening.

8. A method as set forth in claim 6 wherein said air pulse directing means includes a conduit in said exhaust chamber, means for supplying air under pressure to said conduit, and means for directing air from said conduit toward said wall opening such that said air pulses are emitted from said conduit and propagate toward said wall opening in a cone-shaped pattern, and wherein said method further comprises the step of providing a nozzle directing reverse pulses of air from said conduit toward said wall opening, said nozzle accelerating the air emitted toward said wall opening to supersonic velocity.

9. An apparatus for use in a dust collector including a hopper, an exhaust chamber, a wall separating the hopper and the exhaust chamber, the wall including an opening means defining an inlet into the hopper for introducing contaminated air into the hopper, and means for selectively directing reverse pulses of air into the wall opening from the exhaust chamber, said apparatus comprising means for filtering contaminated air flowing through the opening from the hopper, said filtering means including a hollow filter assembly comprising filter medium and having upper and lower ends, said upper end of said filter assembly registering with the wall opening such that the hopper is generally sealed from the exhaust chamber except through the wall opening and said filter medium of said filter assembly so that the contaminated air is caused to flow to the exhaust chamber through said filter medium whereby airborne contaminants are accumulated on said filter medium, and so that the reverse air pulses enter said filter assembly and generate an airflow through said filter medium in the reverse of the direction of contaminated airflow to remove accumulated contaminants from said filter medium, and an air impermeable cylinder located in said exhaust chamber, said cylinder having an open upper end and an outer surface, said cylinder being supported by said lower end of said filter assembly and positioned inside said hollow filter assembly with said outer surface spaced from said filter medium, and with said upper end of said cylinder opening upwardly into said filter assembly, said cylinder having a length such that the air pulses entering the wall opening enter said upper end of said cylinder and do not impinge upon said filter medium.

10. A dust collector comprising
a hopper,
an exhaust chamber,
a wall separating said hopper and said exhaust chamber, said wall including an opening,
means for filtering contaminated air flowing air flowing through said opening from said hopper, said filtering means including a hollow filter assembly comprising filter medium and having upper and lower ends, said upper end of said filter assembly registering with said wall opening such that said hopper is generally sealed from said exhaust chamber except through said wall opening and said filter medium of said filter assembly,
means defining an inlet into said hopper for introducing contaminated air into said hopper so that the contaminated air is caused to flow to said exhaust chamber through said filter medium whereby airbourne contaminants are accumulated on said filter medium,
means for selectively directing reverse pulses of air into said wall opening from said exhaust chamber whereby the reverse air pulses enter said filter assembly and generate airflow through said filter medium in the reverse of the direction of contaminated airflow to remove accumulated contaminants from said filter medium, said air pulse directing means including pulse generating means spaced above said wall opening for causing the air pulses to propagate toward said wall opening in a cone-shaped pattern, and
means for preventing the air pulses from impinging upon said filter medium, said means including deflector means housed inside said lower end of said filter assembly.

11. A dust collector as set forth in claim 10 wherein said deflector means includes an air impermeable cylinder having an open upper end and an outer surface, said cylinder being supported by said lower end of said filter assembly and being positioned inside said filter assembly with said outer surface spaced from said filter medium, and with said upper end of said cylinder opening upwardly into said filter assembly, said cylinder having a length such that the air pulses entering said wall opening enter said upper end of said cylinder and do not impinge upon said filter medium.

12. A dust collector as set forth in claim 10 wherein said pulse generating means includes a nozzle.

13. A dust collector as set forth in claim 10 wherein said pulse generating means includes means for accelerating the air emitted toward said wall opening to supersonic velocity, said means including a nozzle.

14. A dust collector as set forth in claim 13 wherein said means for directing reverse pulses of air further includes a conduit in said exhaust chamber and means for supplying air under pressure to said conduit, and wherein said nozzle is supported by said conduit and directs air from said conduit toward said opening.

15. A dust collector comprising
a hopper,
an exhaust chamber,
a wall separating said hopper and said exhaust chamber, said wall including an opening,
means for filtering contaminated air flowing through said opening from said hopper, said filtering means including a hollow filter assembly comprising filter medium and having upper and lower ends, said upper end of said filter assembly registering with said wall opening such that said hopper is generally sealed from said exhaust chamber except through said wall opening and said filter medium of said filter assembly,
means defining an inlet into said hopper for introducing contaminated air into said hopper so that the contaminated air is caused to flow to said exhaust chamber through said filter medium whereby airbourne contaminants are accumulated on said filter medium,
means for selectively directing reverse pulses of air into said wall opening from said exhaust chamber whereby the reverse air pulses enter said filter assembly and generate airflow through said filter medium in the reverse of the direction of contaminated airflow to remove accumulated contaminants from said filter medium, and
means for preventing the air pulses from impinging upon said filter medium, said means including an upwardly opening cup-shaped member housed inside said lower end of said filter assembly.

16. A dust collector as set forth in claim 15 wherein said member has an open upper end and an outer surface and is supported by said lower end of said filter assembly with said outer surface spaced from said filter medium, and wherein said member has a length such that the air pulses entering said wall opening enter said upper end of said member and do not impinge upon said filter medium.

17. A dust collector comprising a hopper, an exhaust chamber, said exhaust a wall separating said hopper and chamber, said wall including an opening, means for filtering contaminated air flowing said opening from said hopper, said filtering means including a hollow filter assembly comprising filter medium and having an end registering with said wall opening such that said hopper is generally sealed from said exhaust chamber except through said wall opening and said filter medium of said filter assembly, means defining an inlet into said hopper for introducing contaminated air into said hopper so that the contaminated air is caused to flow to said exhaust chamber through said filter medium whereby airbourne contaminants are accumulated on said filter medium, means located outside said filter assembly for selectively directing reverse pulses of air through said wall opening and into said filter assembly, and deflector means housed inside said filter assembly for intercepting the air pulses and for preventing the air pulses from impinging upon said filter medium, whereby the air pressure in said filter assembly increases until reaching a level sufficient to generate airflow through said filter medium in the reverse of the direction of contaminated airflow to remove accumulated contaminants from said filter medium.

* * * * *

UNITED STATES PATENT AND TRADEMARK OFFICE
CERTIFICATE OF CORRECTION

PATENT NO. : 4,666,472
DATED : May 19, 1987
INVENTOR(S) : William J. Klimczak and Rano R. Wells It is certified that error appears in the above-identified patent and that said Letters Patent is hereby corrected as shown below:

Column 5, line 62, "and generate" should be deleted and --, said-- should be inserted.

Column 7, line 52, the first occurrence of "air flowing" should be deleted.

Column 9, line 4, "filtcr" should be --filter--.

Column 9, line 11, delete "said exhaust".

Column 9, line 12, after "and" insert --said exhaust--.

Column 9, line 14, after "flowing" insert --through--.

Signed and Sealed this

Twentieth Day of October, 1987

Attest:

DONALD J. QUIGG

Attesting Officer

Commissioner of Patents and Trademarks